United States Patent [19]

Chang

[11] Patent Number: 5,287,425
[45] Date of Patent: Feb. 15, 1994

[54] OPTICAL FIBER SC TYPE CONNECTOR ASSEMBLY WITH PARTLY PRE-ASSEMBLED COMPONENTS

[75] Inventor: Peter C. Chang, Mountain View, Calif.

[73] Assignee: Foxconn International, Inc., Sunnyvale, Calif.

[21] Appl. No.: 23,925

[22] Filed: Feb. 26, 1993

[51] Int. Cl.$^5$ .................................................. G02B 6/36
[52] U.S. Cl. ......................................... 385/81; 385/60
[58] Field of Search ...................... 385/81, 53, 60, 62, 385/72, 78, 88, 139, 138

[56] References Cited

U.S. PATENT DOCUMENTS

| | | | |
|---|---|---|---|
| 4,762,389 | 8/1988 | Kaihara | 385/60 |
| 5,082,344 | 1/1992 | Mulholland et al. | 385/60 |
| 5,142,601 | 8/1992 | Shibata et al. | 385/86 |

Primary Examiner—Georgia Y. Epps
Assistant Examiner—John Ngo

[57] ABSTRACT

A SC type connector assembly includes a square hollow front housing (10) and a tubular rear housing (26) interconnected to each, other by means of protrusions (28) of the rear housing (26) captured by the corresponding aperture (18) of the front housing (10). An alignment ferrule (36) is positioned within the interior of the front housing (10) and the rear housing (26) with a spring (42) providing a biased force against the alignment ferrule (36) and the rear housing (26). The rear end of the alignment ferrule (36) extends a distance out of the rear end of the rear housing (26). An auxiliary spacer (50) abuts against the rear end of the rear housing (26). A crimping ferrule (44) is to circumferentially cover the rear portion of the rear housing (26) and most of the spacer (50) for sandwiching the strength members (70) and the jacket (72) of the optical fiber cable (74) therebetween. A boot (58) circumferentially covers the crimping ferrule (44). A coupling nut (60) coaxially surrounds the front housing (10), the rear housing (26) and a portion of the boot (58).

12 Claims, 4 Drawing Sheets

OPTICAL FIBER SC TYPE CONNECTOR ASSEMBLY WITH PARTLY PRE-ASSEMBLED COMPONENTS

BACKGROUND OF THE INVENTION

1. Field of the Invention

The invention relates to optical fiber connectors assembly, especially to an SC type connector with capability of partly preassembled for the convenience of installation of an optical fiber cable thereof in a later time.

2. The Prior Art

As shown in FIG. 1, the conventional optical fiber SC type connector has a hollow insulative front housing 2' interconnecting a tubular metal rear housing 5' by means of a pair of protrusions 51' of rear housing 5' snugly received within the corresponding apertures 21' of the front housing 2' An alignment ferrule 3'extends through the combined unit of the front housing 2' and the rear housing 5' with a spring 4' axially surrounding the alignment ferrule 3' for providing a biased force against the rear housing 2' and the alignment ferrule 3'. A tubular crimping ferrule 6' has the large front portion 61' and the small rear portion 62' wherein the front portion 61' surrounds the rear section 52' of the rear housing 5' for sandwiching the strength members 92' of the optical fiber cable 9' therebetween, and the rear portion 62' incorporates a separate clamping ring 7' to fasten the split jacket 93' of the optical fiber cable 9' therebetween. A boot 8' attachably surrounds the clamping ring 7', the crimping ferrule 6' and the rear section 52' of the rear housing 5'. A coupling nut 1' is circumferentially positioned on the front housing 2', the rear housing 2' and a front portion of the boot 8' such that the front housing 2' can axially move with regard to the coupling nut 1' for engagement or disengagement with a complimentary connector. It is also noted that within the strength members the optical fiber cable 9' has coaxially the nylon buffer sheath 91' for cushioning and protecting the inner optical fiber 94'.

This type prior art connector includes a few components which complicate the assembling process and use a few amount of time when they are assembled with the optical fiber cable. Hence, U.S. Pat. No. 5,142,601 to Shibata discloses this type prior art connector in its FIGS. 16-19 labelled "PRIOR ART". In FIG. 6 of Shibata, an elongated slot along the rear housing is disposed thereof for allowance of radial installation of the optical fiber and its associated nylon buffer sheath. In FIG. 8 of Shibata, it also teaches two, i.e., the left and the right halves structure of the front housing and the rear housing for lateral (radial) combination of any pair of left half and the right half such that the fiber with its associated outer sheath can be easily sandwiched and installed therein. Although these two approaches may preclude axial loading of the fiber into the connector from the rear end which is inconvenient for an operator according to the description in Shibata, it is still required that the all components of the connector must be stored separately until a optical fiber cable is ready thereabout for assembling.

Generally, for the consideration of inventory management and time-saving issue in assembling, a communication system manufacturer intends to have a wholly or partly pre-assembled connector in hand when the operator attaches an optical fiber cable to the connector. Unfortunately, due to the possibility of contamination of the epoxy, i.e., adhesion, which is used to secure the outer surface of the nylon buffer sheath to the inner surface of alignment ferrule when the optical fiber cable is installed into the connector, no SC type connector discloses such pre-assembled structure till now. The reason is that the prior art alignment ferrule is much shorter than the rear housing and the rear end of the alignment ferrule is embedded within the interior of the rear housing. Thus, it is uneasy for an operator to insert an epoxy-coated buffer sheath and its inner fiber into the interior of the alignment ferrule from the rear end of the rear housing without having the epoxy inadvertently contaminate the interior of the rear housing where the fiber passes by, if such front housing, rear housing and the alignment ferrule have been assembled together as a semi-finished matter. As a result, the epoxy attached to the interior of the rear housing will jeopardize the expected bumper effect of the alignment ferrule which may axially moveable with regard to the housing originally.

Accordingly, an object of the present invention is to provide an SC type connector assembly some parts of which may be pre-assembled as a semi-finished product so that the operator of a communication system manufacturer may easily and quickly attach the optical fiber cable thereto for saving his labor and time and increasing his efficiency.

SUMMARY OF THE INVENTION

In accordance with one aspect thereof, the invention is generally directed to an optical fiber SC type connector assembly. The connector assembly includes a square hollow front housing and a tubular rear housing interconnected to each other by means of protrusions of the rear housing captured by the corresponding apertures of the front housing. An alignment ferrule is positioned within the interior of the front housing and the rear housing with a spring providing a biased force against the alignment ferrule and the rear housing. The rear end of the alignment ferrule extends a distance out of the rear end of the rear housing. An auxiliary spacer abuts against the rear end of the rear housing. A crimping ferrule is to circumferentially cover the rear portion of the rear housing and most of the spacer for sandwiching the strength members and the jacket of the optical fiber cable therebetween. A boot circumferentially covers the crimping ferrule. A coupling nut coaxially surrounds the front housing, the rear housing and a portion of the boot. The front housing, the rear housing, and the alignment ferrule with its associated spring may be pre-assembled in the connector manufacturer's place so that the operator of the communication system manufacturer may quickly and easily attach the optical fiber cable to such semi-finished connector assembly.

BRIEFLY DESCRIPTION OF THE DRAWINGS

DESCRIPTION OF THE PREFERRED EMBODIMENT

Figure 1:
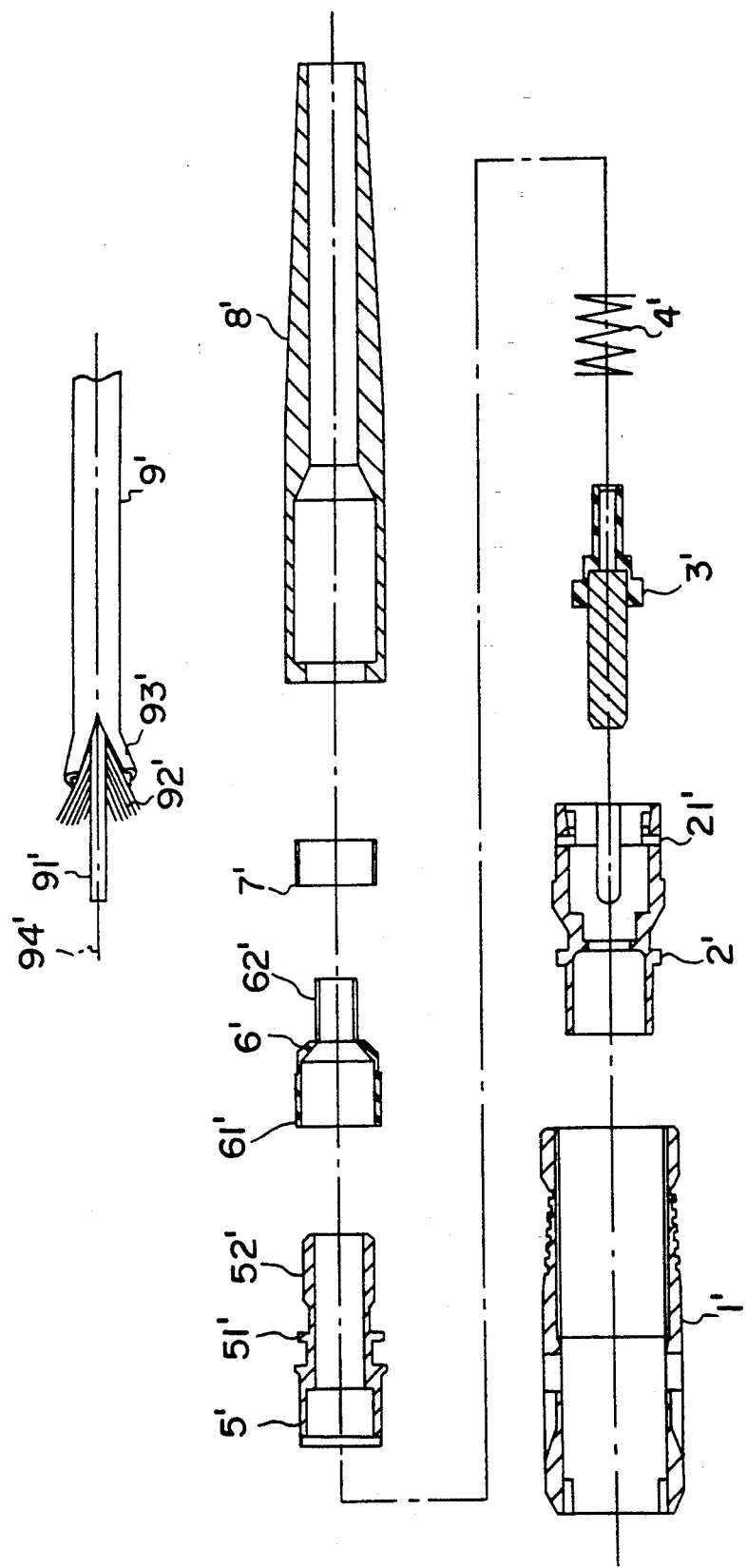
FIG. 1 is a conventional SC type connector of the prior art.
Figure 2:
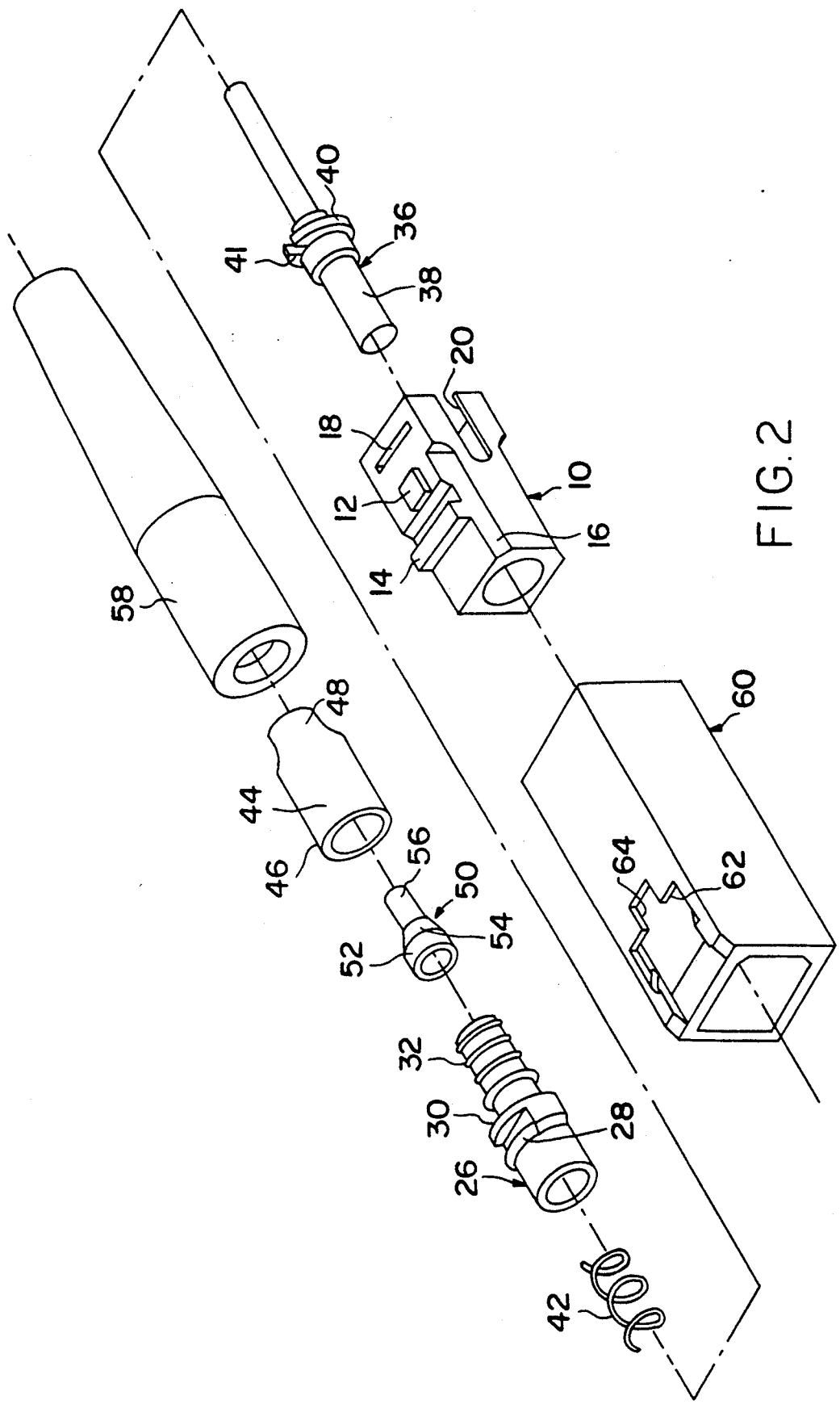
FIG. 2 is a exploded perspective view of a presently preferred embodiment of an SC type connector according to this invention.
Figure 3:
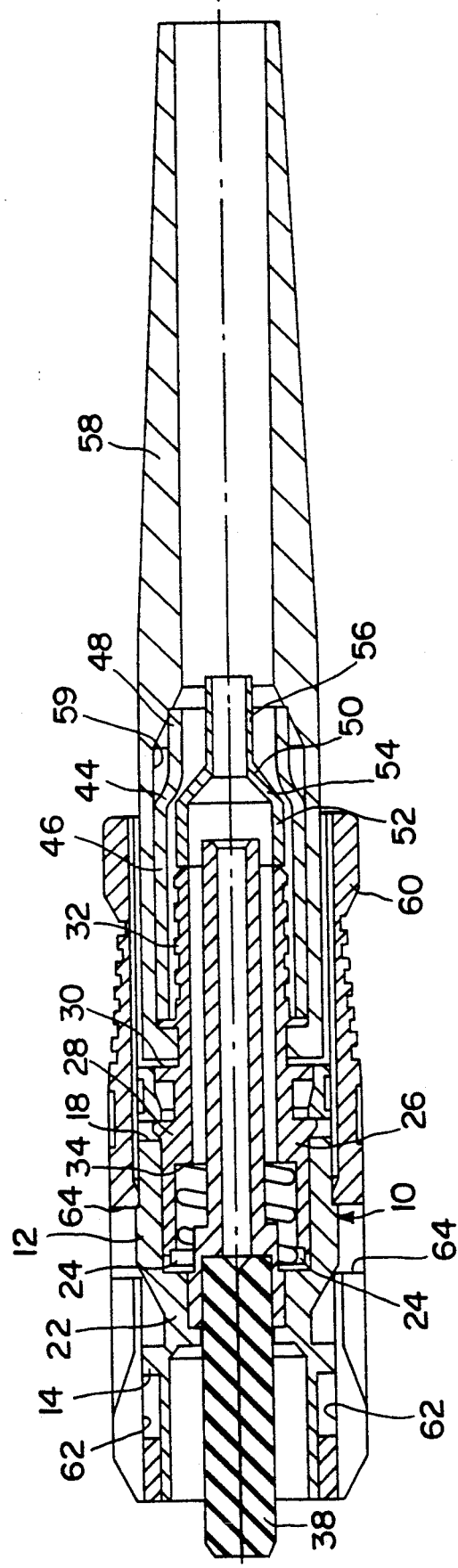
FIG. 3 is a cross-sectional view along the central axis of the assembled connector of FIG. 2 without the optical fiber cable.

Referring to FIGS. 2 and 3, the subject optical fiber connector assembly includes a hollow insulative front housing 10 the cross-section of which has a circular interior and a square exterior. On the external, a pair of protruding blocks 12 and another pair of stopper bars 14 are positioned on two opposite surfaces. A pair of chamfers 16 extend along two opposite edges of one side surface. A pair of slits or apertures 18 are transversely positioned in a pair of opposite surfaces, which are the same surfaces where the protruding blocks 12 and the stopper bars 14 are located, approximate the rear section of the front housing 10 and another pair of grooves 20 are disposed along another pair of opposite surfaces for increasing compressibility thereabout. The slits 18 and the grooves 20 communicate with the interior of the housing 10. In the tubular interior of the front housing 10, a circumferentially inwardly extending flange 22 is positioned in the middle portion. A pair of key elements 24 are diametrically oppositely and lengthwise placed close to the flange 22 on the internal surface of the housing 10.

A metal tubular rear housing 26 includes a pair of diametrically opposite protrusions 28 on the front portion. A recessed zone 30 is positioned in the rear of the protrusions 28. A series of protruding rings 32 are defined on the outer surface of the housing 26 in the rear section. An interior shoulder 34 is disposed near the front portion of the housing 26. An tubular alignment ferrule 36 has an insertion molding ceramic ferrule 38 at the front end and an outwardly extending flange 40 formed behind the ceramic ferrule 38. A pair of indents 41 are diametrically oppositely positioned in the flange 40 for corresponding to the key elements 24 of the front housing 10. A coil spring 42 may loosely surround the alignment ferrule 36.

The connector assembly further comprises a hollow crimping ferrule 44 having a large first section 46 and a small second section 48 for conformity to the shape of an inner spacer 50. The hollow auxiliary spacer 50 is positioned in the rear of the crimping ferrule 44, including a large front section 52, a middle neck section 54 and a small rear section 56. A hollow elongated boot 58 has an interior circumferentially recessed space 59 in the front portion for reception of the crimping ferrule 44.

A hollow square cross-section coupling nut 60 axially movably covers the front housing 10 and the rear housing 26. A pair of openings 62 are positioned in two opposite planes and each opening further comprises a small indention 64 thereof. The interior surface of the coupling nut 60 has a pair of chamfers (not shown) to correspond to the chamfers 16 of the front housing 10 for polarization of assembling.

It can be noted that the front housing 10, the rear housing 26 and the alignment ferrule 36 may pre-assembled in the connector manufacturer's place before the components of the whole connector assembly are shipped to the communication system manufacturer for combination with an optical fiber cable. In this pre-assembling process, the alignment ferrule 36 is coaxially inserted into the interior of the front housing 10 from the rear until the outwardly extending flange 40 of the alignment ferrule 36 confronts the inwardly flange 22 of the front housing 10 and the key elements 24 of the front housing 10 is received within the indents 41 of the flange 40 of the alignment ferrule 36. It can be understood that the combination of the key elements 24 and the indents 41 provides an anti-rotation function between the front housing 10 and the alignment ferrule 36. The ceramic ferrule 38 protrudes out of the front housing 10 for easy access to another complimentary connector when coupling.

Subsequently, the spring 42 is loaded onto the alignment ferrule 36 from the rear until confrontation with the flange 40 thereof. And the rear housing 26 is coaxially connected to the front housing 10 from the back by means that the protrusions 28 are snugly received within the corresponding slits 18. It can be seen that the grooves 20 provide proper compressibility of the front housing 10 for easy insertion of the rear housing 26 when the protrusions 28 engage the interior of the front housing 10. It can be appreciated that when the front housing 10, the rear housing 26 and the internal alignment ferrule 36 associated with the spring 42 are pre-assembled as a semi-finished product, the rear end of the alignment ferrule 36 extends out of the rear end of the rear housing 26 a distance. In this situation, the spring 42 provides the biased force against the shoulder 34 of the rear housing 26 and the flange 40 of the alignment ferrule 36, which makes the ceramic ferrule 38 intend to be positioned in a forward position for easy coupling with another complimentary connector and offers a bumper effect during this coupling.

Figure 4:
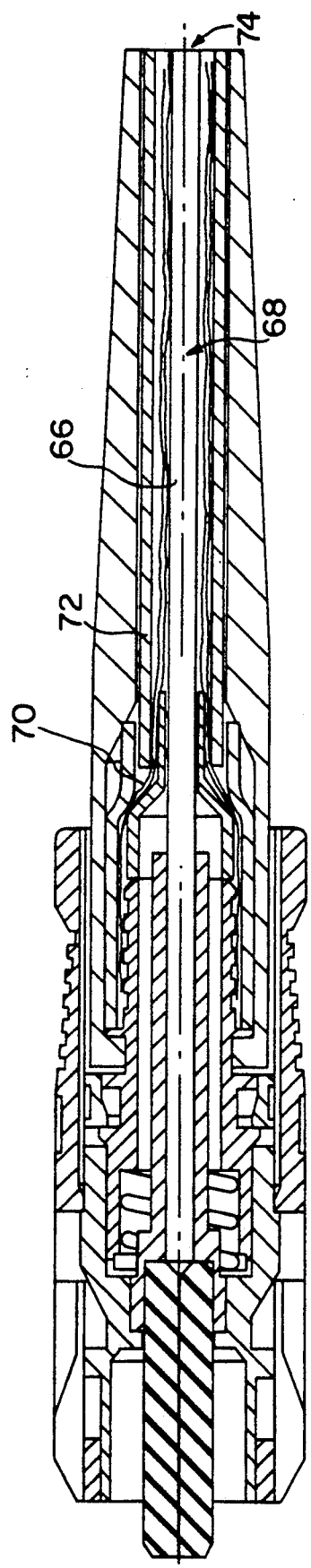
FIG. 4 is a cross-sectional view of the assembled connector with the optical fiber cable.

Based on this pre-assembly, referring to FIG. 4, the operator of a communication system manufacturer can easily and quickly insert the glued buffer sheath 66 with its inner fiber 68 into the interior of the alignment ferrule 36 for installation. Then, with the auxiliary spacer 50 and the crimping ferrule 44, the strength members 70 and the jacket 72 of the optical fiber cable 74 may be sandwiched therebetween. Some portions of the strength members 70 further are tightly pressed between the crimping ferrule 44 and the protruding rings 32 of the rear housing 26. The crimping ferrule 44 is securely attached to the rear housing 26 when it clamps those strength members 70 therebetween. It can be seen that the spacer separates the inner sheath 66 and the outer strength members 70 and the jacket 72.

Successively, the boot 58 coaxially surrounds the crimping ferrule 44 with the crimping ferrule 44 being generally received within the recessed space 59 of the boot 58 and the front end of the boot being received within the recessed zone 30 of the rear housing 26.

Finally, the coupling nut 60 may be installed from the front end. By compressibility, the front housing 10 may inserted into the coupling nut 60 from the back with the polarization of the outer chamfers 16 of the front housing 10 and the inner chamfers of the coupling nut 60. Then, the front housing 10 associated with the other attached components may be axially moveable within a range defined by the opening 62. The forward limit is provided by confrontation of the stopper bars 14 of the front housing 12 and the front edges of the openings 62 of the coupling nut 60. The rearward limit is provided by the reception of the protruding blocks 12 of the front housing 10 within the indentions 64 of the openings 62 in the coupling nut 60. By means of the relative axial movement with regard to the front housing 10, the coupling nut 60 may engage or disengage this connector assembly with another complimentary connector assembly. It is also noted that the auxiliary spacer 50 also provides a sufficient inner space to accommodate the possible backward movement of the alignment ferrule 36 when the connector assembly is coupled to another connector assembly.

While the invention has ben described in connection with what is presently considered to be the most practical and preferred embodiment, it is to be understood that the invention is not limited to the disclosed embodiment but, on the contrary, is intended to cover various modifications and equivalent arrangements included within the spirit and the scope of the appended claims.

Therefore, persons of ordinary skill in this field are to understand that all such equivalent structures are to be included within the scope of the following claims.

What is claimed is:

1. An optical fiber connector assembly comprising:
    a square hollow front housing and a tubular rear housing interconnected to each other by means of protrusions of the rear housing captured by corresponding apertures of the front housing;
    an alignment ferrule positioned within an interior of the front housing and the rear housing with a spring providing a biased force, a rear end of the alignment ferrule protruding out of a rear end of the rear housing a distance;
    an auxiliary spacer abutting against the rear end of the rear housing;
    a crimping ferrule circumferentially covering a rear portion of the rear housing and the spacer;
    a boot generally coaxially covering the crimping ferrule; and
    a coupling nut being axially movable with regard to the connected front housing and the rear housing.

2. The optical fiber connector assembly described in claim 1, wherein the front housing has grooves to enhance expansibility or compressibility thereof.

3. The optical fiber connector assembly describecd in claim 1, wherein the front housing includes a pair of protruding blocks and another pair of stopper bars for axially moveable reception within openings and associated indentations in the coupling nut.

4. The optical fiber connector assembly described in claim 1, wherein the front housing has a circular internal configuration for reception of the tubular rear housing therein and a square external configuration for reception within the coupling nut which has a square interior.

5. The optical fiber connector assembly described in claim 1, wherein the front housing has a pair of key elements for engagement with indents of the alignment ferrule for anti-rotation between the front housing and the alignment ferrule.

6. The optical fiber connector assembly descried in claim 1, wherein the spring surrounds the alignment ferrule and is coaxially positioned between an outward flange of the alignment ferrule and an interior shoulder of the rear housing.

7. The optical fiber connector assembly described in claim 1, wherein the auxiliary spacer provides s pace for receiving a rear end of the alignment ferrule during a rearward movement of the alignment ferrule.

8. The optical fiber connector assembly described in claim 1, wherein the auxiliary spacer is of a tubular type including a large front section, a small rear section and a middle neck section therebetween.

9. An optical fiber connector pre-assembly comprising:
    a square hollow front housing and a tubular rear housing interconnected to each other by means of protrusions of the rear housing captured by corresponding apertures of the front housing; and
    an alignment ferrule positioned within an interior of the front housing and the rear housing with a spring providing a biased force, a ceramic ferrule positioned at a front end of said alignment ferrule and forward protruding out of the front housing for easy access to another complementary connector, and a rear end of the alignment ferrule rearward protruding out of an outermost rear end of the rear housing wherein said outermost rear end of the rear housing is positioned opposite to and far from said ceramic ferrule, so that a tubular auxiliary spacer is ready to be positioned behind the rear housing and side-by-side abut against said outermost rear end of the rear housing to provide a space therein for rearward movement of the rear end of the alignment ferrule.

10. The optical fiber connector pre-assembly as described in claim 9, wherein a rear portion of the rear housing and said spacer can be covered by a crimping ferrule whereby strength members and a jacket of an optical fiber cable can be designedly sandwiched therebetween.

11. The optical fiber connector pre-assembly as described in claim 10, wherein a boot may further coaxially over the crimping ferrule.

12. The optical fiber connector pre-assembly as described in claim 10, wherein a coupling nut may be further disposed on and axially movable with regard to the connected front housing and rear housing.

* * * * *